Patented May 19, 1925.

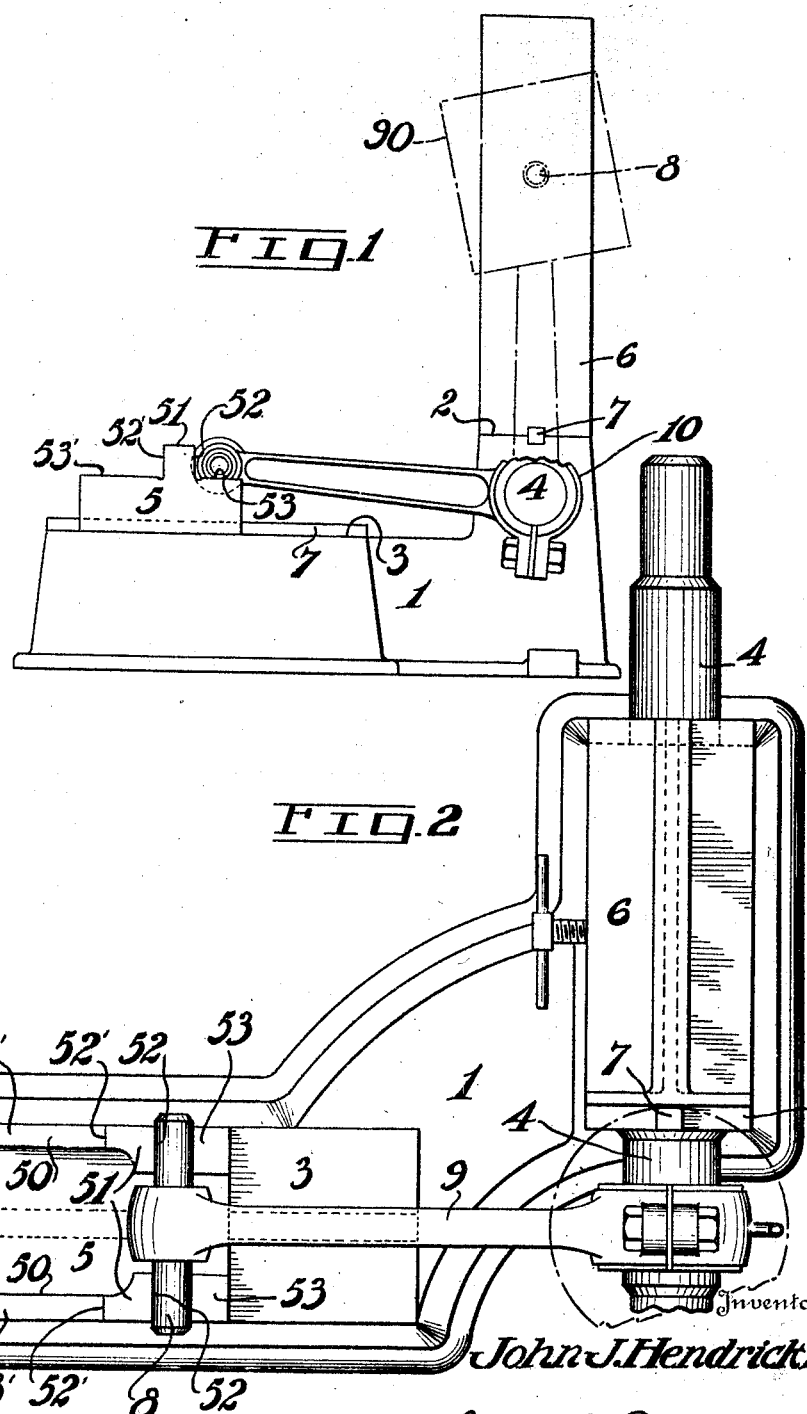

1,538,186

UNITED STATES PATENT OFFICE.

JOHN J. HENDRICKS, OF SEATTLE, WASHINGTON.

TESTING JIG FOR ENGINE CONNECTING RODS.

Application filed November 7, 1921. Serial No. 513,495.

*To all whom it may concern:*

Be it known that I, JOHN J. HENDRICKS, a citizen of the United States of America, and resident of the city of Seattle, in the county of King and State of Washington, have invented certain new and useful Improvements in Testing Jigs for Engine Connecting Rods, of which the following is a specification.

My invention relates to jigs used for testing the accuracy of the bores and other parts of an engine connecting rod and its attachment to the piston.

The object of my device is to provide a jig which may be used for testing the accuracy of the finished parts of a connecting rod and its attachment to the piston to determine what changes or alterations may be necesary to secure proper relative position of the parts thereof and one which may be adapted for use in testing such parts of engines having their rods of varying dimensions.

My invention consists of the device illustrated in the accompanying drawings and hereinafter described.

The features of this device which I believe to be new and upon which I desire to secure a patent will be particularly defined in the claims terminating this specification.

Figure 1 is a front elevation of the device showing a connecting rod in place thereon for testing.

Figure 2 is a plan view of the same machine, showing a connecting rod thereon.

Connecting rods and pistons of engines as first manufactured are often not exactly correct in the alinement and relative positioning of the bearings at the ends of the connecting rod and often are inaccurate in the boring of the piston to receive the wrist pin. It is essential for proper operation of an engine that the wrist pin and crank pin bearings should have truly parallel axes and also that the axis of the wrist pin be truly perpendicular to the axis of the piston. The object of my invention is to determine whether or not this condition has been met and to provide means whereby such condition may be obtained where it has not been secured at the time of manufacture of the parts.

My device has a frame or base 1 which may vary considerably in its shape and construction. This frame has therein a bore for the reception of an arbor which is designed to represent the crank pin of the engine. It also has thereon two guides, one of which has its bearing and guiding surfaces extending parallel with the axis of the arbor and the other having its guiding surfaces extending substantially perpendicular to the axis of the arbor, upon each of which sliding or guiding surfaces is mounted a slide which is movable in the one case lengthwise of the arbor and in the other case perpendicular thereto.

In the device as shown two flat tables 2 and 3 are provided, both being horizontal planes. One of these, as the plane 2, is located directly over the circular bore 10 in which is placed the arbor 4 and has its length extending lengthwise of the arbor. This arbor 4 has one or both ends projecting from the bore and turned in steps of different diameters to truly correspond with the diameters of the crank pins of certain makes of engines, one corresponding with that of the engine for which the connecting rod being tested was made. The diameter of these end sections of the arbor would vary in accordance with the varying diameter of the engine crank pins. The arbor is easily inserted and removed and a set of arbors may be provided so that the machine may be used for testing connecting rods of a large number of makes of engines.

The other table surface 3 is located a little below the axis of the arbor and extending parallel thereto.

In connection with each of these guiding surfaces 2 and 3 a movable slide is provided. These slides are mounted to move upon these surfaces, the slide 5 in a direction substantially perpendicular to the axis of the arbor and the slides 6 in a direction parallel with the axis of the arbor. While the direction of movement indicated is preferred, it is not essential that this be strictly conformed to. The accurate position of the test planes relative to the axis of the rod-pivoting shaft is the more essential thing. These slides are secured in position upon the tables 2 and 3 respectively, in such manner that they will be held in exact relation to the axis of the arbor. A convenient way to do this is that shown wherein the table is provided with a rib and the slide is provided with a slot extending lengthwise thereof in the proper direction or a groove is provided in each and a guide key, as 7, is secured so as to enter both of these. Any other suitable manner of securing correctness of position and movement may be employed.

The slide 5 which is mounted upon the laterally extending guide table has an upwardly extending flange 50 at each side thereof. The top surfaces of these flanges are made as parts of a horizontal plane which is truly parallel with the axis of the arbor. In other words, the plane which corresponds with an extension of these surfaces would be truly parallel with the axis of the arbor and in some cases might intersect such axis. In any event it should preferably extend very close to such axis.

Intermediate of the length of the flanges 50, upwardly projecting lugs 51 are provided. The two side faces 52 and 52' of these lugs are made as parts of planes which are truly parallel with the axis of the arbor. The surfaces 53 and 53' located at opposite sides of the lugs 51, are extensions of the same surface and are to be used in a similar way.

In testing the accuracy of the bores in the two ends of the connecting rod 9, the rod is placed with its crank pin end upon the arbor and clamped thereon sufficiently to make a snug and true fit. The wrist pin 8 is then put in place in the other end of the connecting rod 9. When the wrist pin has been put in position in its end of the connecting rod it is swung down so as to rest upon the surface 53 or 53' as the case may be. If the bearings in the two ends of the rod are true the wrist pin will bear evenly and truly upon both of these surfaces. The block 5 is then moved so as to bring the vertical surface 52 or 52' as the case may be, into contact with the sides of the wrist pin. If the wrist pin contacts with both of these surfaces alike then the bearings are true. If, however, in either of these tests contact is made with one side and not with the other, the connecting rod should be bent or twisted as may be necessary so as to secure true contact on both sides at the same time.

With a short connecting rod, or with a connecting rod which is not too long for such operation, the surfaces 52 and 53 which are at the end of the block towards the arbor 4 would be most conveniently used. When, however, the connecting rod is too long for this, or when for any other reason it may be desirable to do so, the surfaces 52' and 53' at the outer end of the block would be employed. The elevation of the surfaces 53, 53' above the central part of the block leaves a central channel or space for the accommodation of the connecting rod.

The slide 6 which is mounted in connection with the other table 2 has a vertical plane outer face which lies in a plane perpendicular to the axis of the arbor. This surface is used in testing the accuracy of the bore in the piston which receives the wrist pin. To do this the piston is secured to the connecting rod by passing the wrist pin through each. It is then swung up into the position shown in broken lines in Figure 1 wherein 90 represents the outline of the piston and the slide 6 is brought up into contact with the side surface of the piston. If the side surface of the piston contacts throughout its length with the face of the slide 6, the bearing of the wrist pin therein is truly perpendicular to the axis of the piston. If, however, one end of the side of the piston is held outward from the gaging surface, then the bearing for the wrist pin is not true and needs correcting.

The device just described is simple and cheap in its construction and is adapted for testing the accuracy of the connecting rod and piston parts of substantially all engines, at least such as are used in automobile work. A series of arbors 4 would have to be provided so as to adapt it for use in connection with all engines. These arbors may usually be provided with two end sections turned to correspond in diameter with that of the crank pins of certain engines. A set of these arbors would suffice for a considerable number of makes of engines.

What I claim as my invention is:

1. A connecting rod testing jig comprising a base having a connecting-rod-pivoting shaft and two sets of guide ways, a slide movable upon each set of guideways, one slide having a piston trueing surface disposed in a plane perpendicular to the axis of said shaft and the other slide having a pair of trueing surfaces disposed in a plane parallel to the axis of said shaft and adapted to engage with the sides of the wrist pin of a connecting rod when it is pivoted upon said shaft.

2. A connecting rod testing jig comprising a base having a bore for the reception of a rod-pivoting shaft and two sets of guideways extending in planes which are respectively substantially at right angles to each other with one plane parallel with the axis of the rod-receiving bore, a slide mounted upon each of said guide ways, one slide having wrist-pin trueing surfaces and the other slide a piston trueing surface.

3. A connecting rod testing jig having a base provided with a shaft-receiving bore, a rod-pivoting shaft insertible in said bore and having stepped sections of diameters adapted to fit a plurality of connecting rod bearings, guideways upon the base and slides movable upon said guideways, one of said guideways permitting movement of its slide parallel with the axis of the rod-pivoting shaft, its slide having a plane testing surface perpendicular to said axis and the other of said guideways permitting movement of its slide perpendicular to a plane which includes the axis of said shaft and its slide having testing planes positioned substantially at right angles to each other with their line of intersection parallel with the axis of said shaft.

4. A connecting rod testing jig comprising a base having a shaft-receiving bore and a shaft having a section fitting said bore with one end projecting therefrom to form an overhanging section, the base having guideways laterally offset from said overhanging section and with their guiding surfaces extending at right angles to a plane which includes the shaft axis, a slide mounted upon said guideways to be moved toward and from the shaft, said slide having plane testing surfaces angularly positioned with respect to each other and parallel with the axis of the shaft.

Signed at Seattle, King County, Washington this 29th day of October 1921.

JOHN J. HENDRICKS.